(12) United States Patent
Lee

(10) Patent No.: US 7,000,033 B2
(45) Date of Patent: Feb. 14, 2006

(54) MAPPING OF NODES IN AN INTERCONNECTION FABRIC

(75) Inventor: Whay S. Lee, Newark, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 838 days.

(21) Appl. No.: 09/967,137

(22) Filed: Sep. 28, 2001

(65) Prior Publication Data

US 2003/0065821 A1 Apr. 3, 2003

(51) Int. Cl.
*G06F 15/16* (2006.01)
*G06F 11/00* (2006.01)
*H04L 12/18* (2006.01)

(52) U.S. Cl. .................... 709/249; 714/43; 370/254
(58) Field of Classification Search ............. 709/249; 714/43; 370/254
See application file for complete search history.

(56) References Cited

U.S. PATENT DOCUMENTS

| | | | |
|---|---|---|---|
| 5,303,246 A | * | 4/1994 | Anderson et al. ........... 714/727 |
| 5,689,646 A | | 11/1997 | Thorson |
| 5,689,661 A | | 11/1997 | Hayashi et al. |
| 5,701,416 A | | 12/1997 | Thorson et al. |
| 5,720,025 A | | 2/1998 | Wilkes et al. |
| 5,737,628 A | | 4/1998 | Birrittella et al. |
| 5,970,232 A | | 10/1999 | Passint et al. |
| 6,016,510 A | | 1/2000 | Quattromani et al. |
| 6,023,753 A | | 2/2000 | Pechanek et al. |
| 6,055,618 A | | 4/2000 | Thorson |
| 6,101,181 A | | 8/2000 | Passint et al. |
| 6,167,502 A | | 12/2000 | Pechanek et al. |
| 6,430,182 B1 | * | 8/2002 | Oyama ..................... 370/388 |
| 6,681,316 B1 | * | 1/2004 | Clermidy et al. ............ 712/11 |
| 6,694,361 B1 | * | 2/2004 | Shah et al. ................ 709/222 |
| 6,804,712 B1 | * | 10/2004 | Kracht ..................... 709/223 |
| 2003/0208572 A1 | * | 11/2003 | Shah et al. ................ 709/223 |

FOREIGN PATENT DOCUMENTS

| | | |
|---|---|---|
| EP | 0 785 512 | 7/1997 |
| WO | 99/26429 | 5/1999 |

OTHER PUBLICATIONS

Bradley Kuszmaul, Mercury Computer Systems, Inc., "The RACE Network Architecture," (posted at www.mc.com/techlit/#tech_brief prior to this), 6 pages.

R.Y. Wang, T.E. Anderson and D.A. Patterson, "Virtual Log Based File Systems For a Programmable Disk," Proc. Third Symposium on Operating Systems Design and Implementation, Feb. 1999 (Also appeared as University of California Technical Report CSD-98-1031, 16 pages.

Prasant Mohapatra, Wormhole Routing Techniques for Directly Connected Multicomputer Systems, ACM Computing Surveys, vol. 30, No. 3, Sep. 1998, 37 pages.

(Continued)

Primary Examiner—William A. Cuchlinski, Jr.
Assistant Examiner—Michael Delgado
(74) Attorney, Agent, or Firm—Meyertons Hood Kivlin Kowert & Goetzel, P.C.; B. Noel Kivlin

(57) ABSTRACT

A method and system for mapping nodes in an M×N torus interconnection fabric of nodes is provided. The method includes generating an observed mapping of the nodes in the interconnection fabric showing a location of a first node relative to an x-axis of the fabric and relative to a y-axis of the fabric, comparing the observed mapping of the nodes to a set of expected mappings, and identifying the expected mapping which is most similar to the observed mapping.

25 Claims, 7 Drawing Sheets

OTHER PUBLICATIONS

Christopher Glass and Lionel Ni, "The Turn Model for Adaptive Routing," Journal of the Association for Computing Machinery, vol. 41, No. 5, Sep. 1994, pp. 874–902.

Reddy, Dept. of Computer & Information Sciences, "A Dynamically Reconfigurable WDM LAN Based on Reconfigurable Circulant Graph," IEEE, 1996, 4 pages.

Funahashi, Jouraku and Amano, "Adaptive Routing for Recursive Diagonal Torus," Transactions of the Institute of Electronics, Information and Communication Engineers D–I, vol. J83D–I, No. 11, Nov. 2000, pp. 1143–1153.

Milan Kovacevic, Center for Telecommunications Research, "On Torus Topologies with Random Extra Links," IEEE 1996, pp. 410–418.

Dally, et al., The Torus Routing Chip, Distributed Computing, Springer–Verlag 1986, pp. 187–196.

Susan Hinrichs, "A Compile Time Model for Composing Parallel Programs," IEEE Parallel and Distributed Technology, 1995, 19 pages.

"Cray T3D System Architecture Overview Manual," ftp://ftp.cray.com/product-info/mpp/T3D_Architecture_Over/T3D.overview.html, Cray Research, 1993, 40 pages.

Marco Fillo, et al., "The M–Machine Multicomputer," Laboratory for Computer Science, Massachusetts Institute of Technology, A.I. Memo No. 1532, Ann Arbor,. Mar. 1995, 14 pages.

Noakes, et al., "The J–Machine Multicomputer: An Architectural Evaluation," Proceedings of the $20^{th}$ International Symposium on Computer Architecture, May 1993, 12 pages.

Dally, et al., "Architecture of a Message–Driven Processor," International Conference on Computer Architecture, Jun. 1987, pp. 189–196.

Dennison, Lee and Dally, "High–Performance Bidirectional Signalling in VLSI," Massachusetts Institute of Technology, Oct. 12, 1992, 20 pages.

Dally, et al., "Architecture and Implementation of the Reliable Router," Mass. Institute of Technology, Proceedings of Hot Interconnects II, Stanford CA, Aug. 1994, 12 pages.

Dally, et al., "The Reliable Router: A Reliable and High-Performance Communication Substrate for Parallel Computers," Proceedings of the First International Parallel Computer Routing and Communication Workshop, Seattle WA, May 1994, 15 pages.

Dennison, et al., "Low–Latency Plesiochronous Data Retiming," Mass. Institute of Technology, Proceedings of the 1995 Advanced Research in VLSI Conference, Chapel Hill NC, Mar. 1995, 12 pages.

Whay S. Lee, "Mechanism for Efficient, Protected Messaging," Massachusetts Institute of Technology, Dept. of Electrical Engineering and Computer Science, Jan. 20, 1999, 147 pages.

Dennison, "Reliable Interconnect Networks for Parallel Computers," Mass. Institute of Technology, Dept. of Electrical Engineering and Computer Science, Apr. 18, 1991, 79 pages.

Thucydides Xanthopoulos, "Fault Tolerant Adaptive Routing in Multicomputer Networks," Dept. of Electrical Engineering and Computer Science , Mass. Institute of Technology, Jan. 20, 1995, 152 pages.

Dennison, "The Reliable Router: An Architecture for Fault Tolerant Interconnect," Dept. of Electrical Engineering and Computer Science, Mass Institute of Technology, May 24, 1996, 145 pages.

"Introduction To Parallel Algorithms and Architectures: Arrays, Trees, Hypercubes," F. Thomson Leighton, Morgan Kaufmann Publishers, 1992, pp. 1–831.

Christopher J. Glass and Lionel Ni, "Fault–Tolerant Wormhole Routing in Meshes," Technical Report, MSU–CP-S–ACS–72, Oct. 30, 1992 (revised May 25, 1993), 28 pages.

Stefan Savage and John Wilkes, "AFRAID–A Frequently Redundant Array of Independent Disks," Proceedings of the 1996 USENIX Technical Conference, pp. 27–39, San Diego, CA, Jan. 1996, 13 pages.

Steve Ward, et al., "A Modular, Scalable Communications Substrate," MIT Laboratory for Computer Science, Jul. 1993, 10 pages.

Christopher Glass and Lionel $Ni_1$ "The Turn Model for Adaptive Routing," Technical Reports, MSU–CP-S–ACS–44, Oct. 10, 1991 (revised Mar. 2, 1992), pp. 278–287 (numbered herein as 1–20).

Thomas Stricker, "Message Routing on Irregular 2D–Meshes and Tori," School of Computer Science, Carnegie Mellon Univ., Jan. 15, 1991, pp. 170–177 (numbered herein as 1–19).

Dally, et al., "The J–Machine: A Retrospective," in 25 Years of the International Symposia on Computer Architecture—Selected Papers. pp. 54–58.

* cited by examiner

US 7,000,033 B2

MAPPING OF NODES IN AN INTERCONNECTION FABRIC

BACKGROUND OF THE INVENTION

Data communication between components of a computer system can be provided in a number of ways. In many large storage systems, for example, the interconnection solutions may be based on bus architectures such as the small computer system interconnect (SCSI) or fibre channel (FC) standards. In these architectures, multiple storage devices such as hard disk drives may share a single set of wires or a loop of wires for data transfers.

Such architectures may be limited in terms of performance and fault tolerance. Since all of the devices share a common set of wires, only one data transfer may take place at any given time, regardless of whether the devices have data ready for transfer. Also, if a storage device fails, it may be possible for that device to render the remaining devices inaccessible by corrupting the bus. Additionally, in systems that use a single controller on each bus, a controller failure may leave all of the devices on its bus inaccessible. In a large storage array, component failures can occur with significant frequency. As the number of components in a system is increased, the probability that any one component will fail at any given time increases, and, accordingly, the mean time between failures (MTBF) for the system is decreased.

It may be desirable to minimize the effect of errors on data transmission between components by routing messages over an interconnection fabric. Multi-path interconnection fabrics can provide failover capabilities to networks. For example, in certain FC systems, two FC loops are connected into each hard disk drive so that the drives remain accessible, even if one of the FC loops is severed. Because the redundant path can be used when an error occurs in the first path, the system is one-fault tolerant. However, these multi-path interconnection fabrics should be provided with the capability to reliably identify and access the various components connected by to the fabric.

BRIEF SUMMARY OF THE INVENTION

In accordance with aspects of the present invention, a method for mapping nodes in an M×N torus interconnection fabric of nodes is provided. The method comprises generating an observed mapping of the nodes in the interconnection fabric showing a location of a first node relative to an x-axis of the fabric and relative to a y-axis of the fabric; comparing the observed mapping of the nodes to a set of expected mappings; and identifying the expected mapping which is most similar to the observed mapping.

In accordance with other aspects of the present invention, a computer system is provided. The computer system comprises an M×N array of nodes, wherein M and N are integer values; a plurality of interconnects connecting the M×N array; and a first node. The first node is configured to generate an observed mapping of the nodes showing a location of the first node relative to an x-axis of the fabric and relative to a y-axis of the fabric; compare the observed mapping of the nodes to a set of expected mappings; and identify the expected mapping which is most similar to the observed mapping.

In accordance with other aspects of the present invention, an article of manufacture including code for mapping nodes is provided. The code causes operations to be performed, comprising generating an observed mapping of nodes in an M×N interconnection fabric showing a location of a first node relative to an x-axis of the fabric and relative to a y-axis of the fabric, wherein M and N are integer values; comparing the observed mapping of the nodes to a set of expected mappings; and identifying the expected mapping which is most similar to the observed mapping.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

In the following description, reference is made to the accompanying drawings which form a part thereof, and which illustrate several embodiments of the present invention. It is understood that other embodiments may be utilized and structural and operational changes may be made without departing from the scope of the present invention. The use of the same reference symbols in different drawings indicates similar or identical items.

DETAILED DESCRIPTION OF THE INVENTION

Some portions of the detailed description which follows are presented in terms of procedures, steps, logic blocks, processing, and other symbolic representations of operations on data bits that can be performed on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical or magnetic signals capable of being stored, transferred, combined, compared, and otherwise manipulated in a computer system. These signals may be referred to at times as bits, values, elements, symbols, characters, terms, numbers, or the like. Each step may be performed by hardware, software, or combinations of the two.

Figure 1:
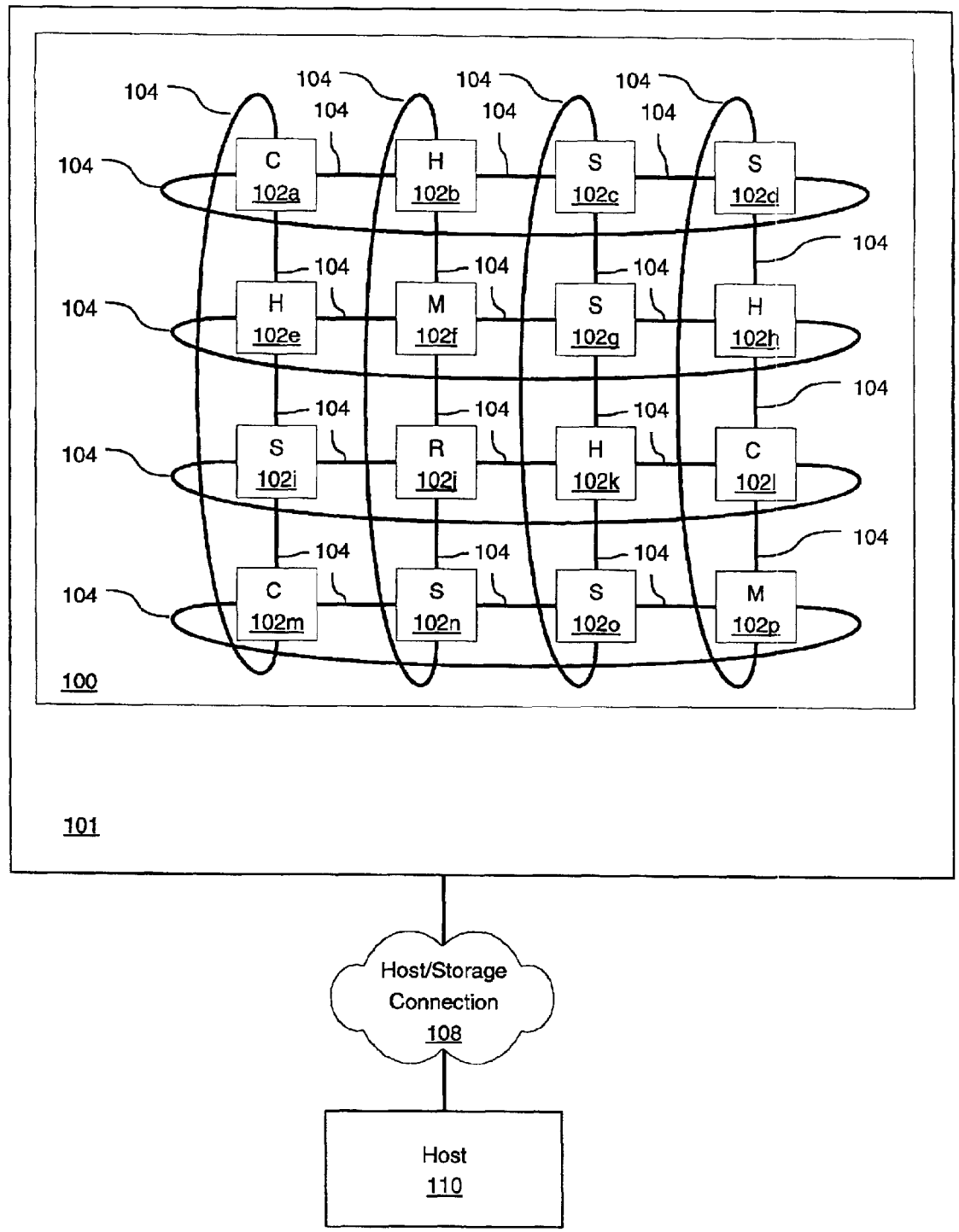
FIG. 1 shows a functional block diagram of a computer system including a 4×4 torus interconnection fabric in accordance with embodiments of the present invention.

FIG. 1 shows a diagram of a torus interconnection fabric 100 having a 4×4 array of nodes 102a–102p in accordance with various embodiments of the present invention. The fabric 100 can be provided as part of a computer system 101. Each node 102 may support one or more different types of components in the computer system. In the illustrated embodiment, computer system 101 is a data storage system, such as one incorporating redundant array of inexpensive disks (RAID) technology, and can connect to a host 110 via a host/storage connection 108. Host/storage connection 108 can be, for example, a local bus, a network connection, another interconnection fabric, or other communication channel. In some embodiments, a plurality of hosts 110 can be in communication with computer system 101 via host/storage connection 108, or a plurality of storage systems 101 can be in communication with one or more hosts 110.

As used herein, computer system refers to any of a variety of systems for processing data, such as, for example, storage subsystems, direct attached storage (DAS) systems, network attached storage (NAS) systems, servers, and mainframe computer systems, or any combination thereof. Interconnection fabric refers to a mesh of multiple point-to-point interconnects linking a plurality of nodes. In various embodiments, an interconnection fabric can provide multiple simultaneous data communications between the nodes, and may be capable of routing data without arbitration.

Each of the nodes 102 is labeled with one of the letters C, H, S, M, and R, indicating the type of component supported by that node. Node C (nodes 102a, 102l, and 102m in FIG. 1) indicates that the node is configured to support a storage controller which provides, for example, RAID processing capability. Node C can be provided with the circuitry and memory used to generate and transmit messages to the other nodes in fabric 100, and may be further configured to process and store data from the other nodes. For this reason, node C can also be referred to as a CPU ("central processing unit") node. Node H (nodes 102b, 102e, 102h, and 102k) indicates that the node is configured with a host interface or line card that may serve as an interface to host/storage connection 108. Node S (nodes 102c, 102d, 102g, 102I, 102n, and 102o) indicates that the node is configured as a storage node and may be connected to or be provided with one or more storage devices, such as hard disk drives. Node M (nodes 102f and 102p) indicates that the node is configured as a storage cache memory node that provides, for example, a storage cache for one or more of the storage nodes S. Node R (node 102j) indicates that the node is configured as a routing node and merely expands the communication paths available between other nodes.

It is noted that while the nodes 102 are configured and labeled in the embodiment shown in FIG. 1, this is only an exemplary drawing. In other embodiments, each of the nodes 102 may support any combination of features and components. Also, other configurations may have a greater or fewer number of nodes 102, and the nodes 102 may be configured and used differently.

As shown in FIG. 1, torus interconnection fabric 100 uses a two-dimensional (2D) array topology with the beginning nodes 102 connected to the endpoint nodes of each row and column. For example, if the 2D array is an M×N array, where M and N are positive integers, then the first node in row 1 (the node in the bottom left corner in FIG. 1) would be connected to the last node in row 1 (the node in the bottom right corner in FIG. 1). Likewise, from a column perspective, the first node in row 1 is also connected to the first node in the top row (the node in the upper left corner in FIG. 1). Each node 102 is configured to transmit data along four point-to-point interconnects 104 to four adjacent nodes 102. Using these interconnects 104, each node 102 may transfer data to and from other nodes 102 in the fabric 100 using multiple communication paths, each path being partially or completely independent of the other paths. To transfer data from a source node 102 in the fabric 100 to a destination node 102, the data may have to travel through multiple interconnects 104 and multiple nodes 102 before reaching the destination node 102.

It is noted that fabric 100 is shown in FIG. 1 as a flat 2D array with longer connections between the endpoints, or "edges" of the array. The illustrated embodiment shows a logical layout of nodes 102 and interconnects 104. However, the physical layout of the devices and structures forming array 100 may be different. For example, each row may be physically oriented in the shape of a ring, such that the distance from the last node to the first node may be approximately equal to the distance between the other nodes.

Figure 2:
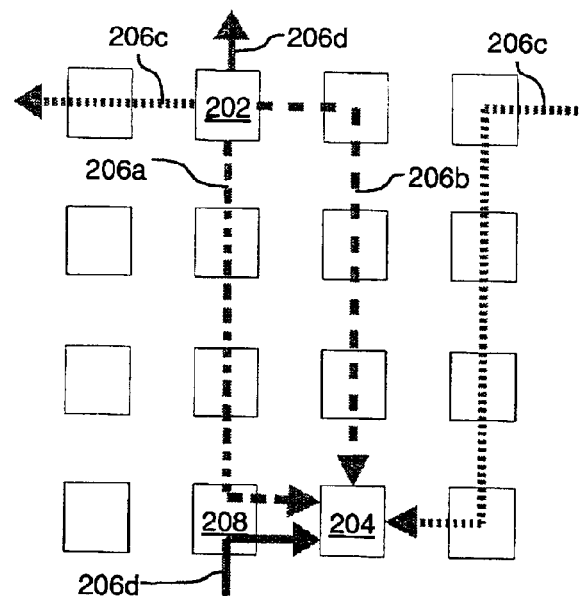
FIG. 2 shows a functional block diagram of multiple communication paths in an interconnection fabric in accordance with embodiments of the present invention.

FIG. 2 illustrates four communication paths 206a–206d between source node 202 and destination node 204. Many other communication paths (not shown) are possible. As can be seen, paths 206a, 206b, and 206c are completely independent of each other (i.e., the data transmitted along these communication paths do not pass through any of the same interconnects 104 or nodes 102 while traveling between source node 202 and destination node 204). Communication path 206d is an alternate communication path which is not independent of path 206a because data transmitted along either of paths 206a and 206d passes through node 208 and the interconnect between node 208 and node 204. Therefore, if node 208 has failed and can no longer transmit data, then both paths 206a and 206d will become inoperative. Having multiple independent communication paths 206 can enable a source node and a destination node to continue communicating with each other even if one or more interconnects and nodes between the source and destination nodes becomes inoperative.

Figure 3:
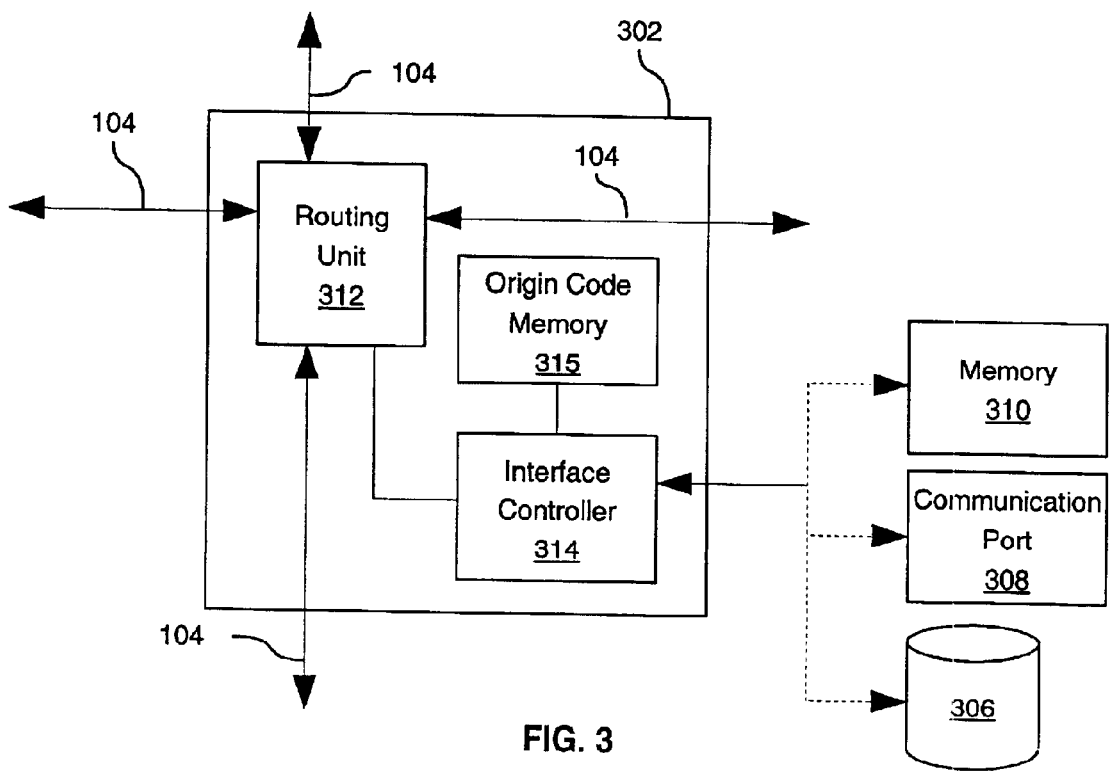
FIG. 3 shows a functional block diagram of a node in accordance with embodiments of the present invention.

FIG. 3 is a functional block diagram showing a node 302, which is an embodiment of node 102 in FIG. 1. Node 302 can be configured to operate in the C, H, S, M, and R modes, as described above. In the embodiment shown, node 302 includes a routing unit 312 connected to an interface controller 314, which is, in turn, connected to an origin code memory 315. Routing unit 312 may be configured to communicate through multiple ports connected to interconnects 104. In the embodiment shown, there are four bidirectional ports, so routing unit 312 may communicate with four neighboring nodes using four independent communication paths.

In some embodiments, node 302 comprises a printed circuit board (PCB) containing a chip or chips and circuitry to perform the functions of routing unit 312 and interface controller 314. Computer system 101 may include a PCB main board containing an M×N array of interfaces (e.g., PCB edge connectors) to which each PCB-based node 302 can be connected. This modular approach can enable the system 101 to be reconfigured to include different types of nodes, such as nodes 102a–102e in FIG. 1, to optimize system 101 for different situations and demands. Each node 302 may be dedicated to one of the various functions described above, or may be configurable to support all of the functions and/or other functions as well. In yet other embodiments, each node can be provided in a portion of the PCB main board of computer system 101.

Interface controller 314 may be configured to communicate with one or more storage devices 306. It is noted that the storage devices 306 may be hard disk drives or any other device for storing data in non-volatile form, such as optical disks, floppy disks, or tape storage. In some embodiments, interface controller 210 may be configured to communicate with a host or a RAID controller through a communication port 308, such as, for example, a peripheral component interface (PCI) bus. In some embodiments, interface controller 314 may be configured to communicate with one or more memories 310, such as a DRAM cache memory or other type of memory or memory controller. Interface controller 314 may be configured to perform all of these functions or any combination of these or other functions. In other embodiments, interface controller 314 may not have any devices attached or interface controller 314 nay be omitted altogether. In these embodiments, node 102 may simply connect to neighboring nodes through routing unit 205. Thus, node 102 may be used as a routing node R 102*e* to increase the number of possible communication paths available. In other embodiments, one or more storage devices 306, communication ports 308, and memories 310 may be included within node 102.

A computer system which employs a torus interconnection fabric, such as fabric 100, may include a way to uniquely identify each node 102, so that any computation running on the system can easily distinguish between the various source and destination nodes for each data transmission. In some embodiments, the system should also know the size of the fabric, so that it may, for example, distribute the workload or data storage intelligently among the nodes of the system. It may be possible to preconfigure the system with a preset size and arrangement of nodes 102 by embedding this information into the firmware or hardware of system 101. However, if the size or arrangement of nodes 102 changes, the system may not be able to recognize the updated nodes.

Figure 4:
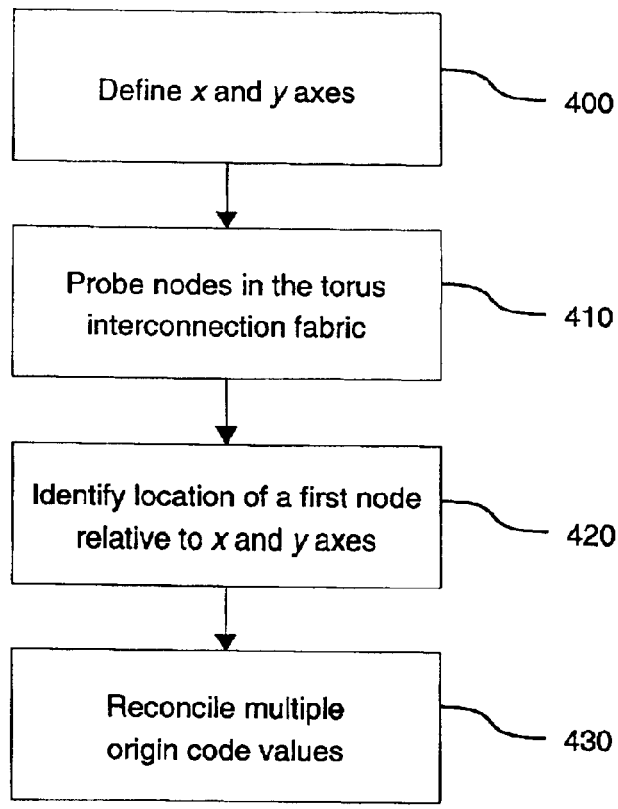
FIG. 4 shows a flowchart of a method for discovering nodes in an interconnection fabric in accordance with embodiments of the present invention.

FIG. 4 is a flowchart of a method for discovering nodes in a torus interconnection fabric in accordance with embodiments of the present invention. In accordance with this method, in step 410, nodes in an M×N interconnection fabric are probed. The interconnection fabric includes a first plurality of nodes defined as forming an x-axis in the fabric and a second plurality of nodes are defined as forming a y-axis in the fabric. In step 420, the location of a first node relative to these x and y axes is identified. In other embodiments, the invention may also include step 400, in which the x and y axes are defined prior to the probing step 410, and step 430, in which the origin code values received by multiple sources are reconciled. These methods can be further understood with reference to the description below. This discovery process can be performed, for example, when system 101 is first booted up or reset.

Figure 5A:
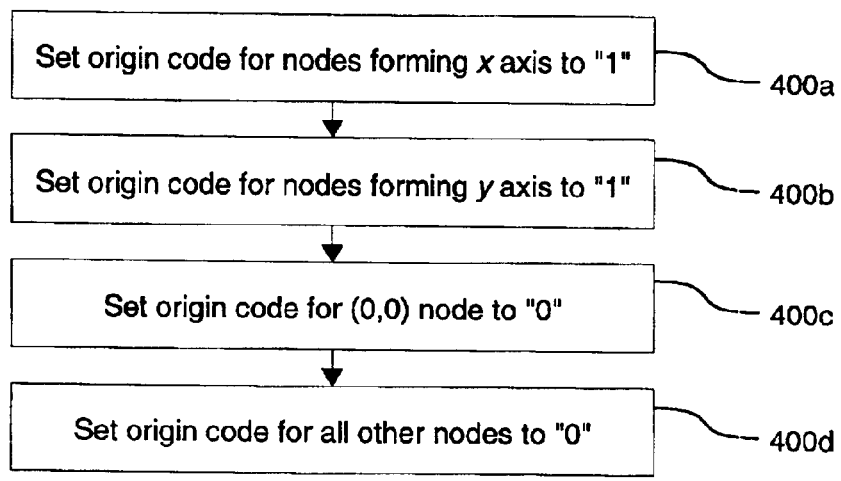
FIGS. 5a-5d show flowcharts of methods for discovering nodes in an interconnection fabric in accordance with embodiments of the present invention.

FIGS. 5*a*–5*d* are flowcharts of more detailed methods for discovering nodes in a torus interconnection fabric in accordance with embodiments of the present invention. FIG. 5*a* shows steps 400*a*–400*d*, which correspond to one embodiment for performing step 400 in FIG. 4. In step 400*a*, the first plurality of nodes are defined as forming the x-axis by setting an origin code associated with each node in the first plurality of nodes to "1". In step 400*b*, a second plurality of nodes are defined as forming the y-axis by setting an origin code associated with each to "1". In step 400*c*, the node located at (0,0) has its origin code set to "0". Finally, in step 400*d*, all other nodes have their origin codes set to "0". These steps can be more easily understood with reference to FIG. 6, which shows an interconnection fabric 600 containing a 4×4 array of nodes.

Figure 6:
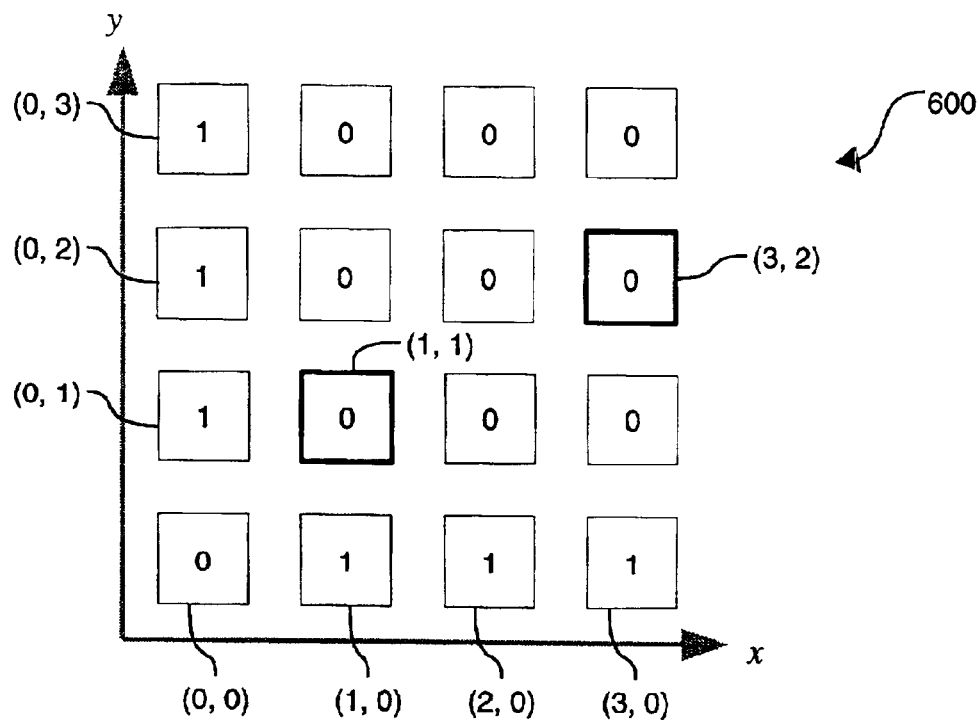
FIG. 6 shows a functional block diagram of an interconnection fabric in accordance with embodiments of the present invention.

In FIG. 6, nodes (1,0), (2,0), and (3,0) are defined as forming the x-axis in fabric 600. Nodes (0,1), (0,2), and (0,3) are defined as forming the y-axis in fabric 600. The defining of the nodes as axes can be performed in a variety of ways. Each node can comprise a PCB provided with origin code memory 315, such as a select pin or a DIP switch, which can be a constant one-bit register set at either "1" or "0". Each of the nodes forming the x and y axes ((1,0), (2,0), (3,0), (0,1), (0,2), and (0,3)) have their origin codes set to "1", while the node located at (0,0) and all other nodes have their origin codes set to "0". It is noted that the selection of which nodes form the x and y axes may be arbitrary and used simply to provide a constant frame of reference for addressing and locating the nodes in fabric 600, as will be described in more detail below. The selection of the x and y axes and the setting of the origin codes can be performed, for example, by a technician at the time computer system is assembled. These settings can also be changed if the arrangement or number of nodes in the fabric are modified at a later point.

Figure 5B:
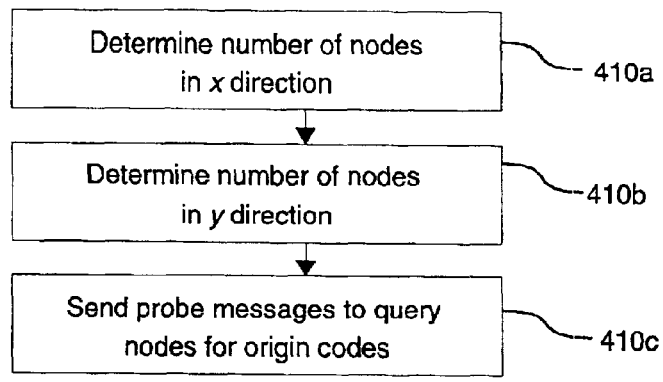
Figure 5C:
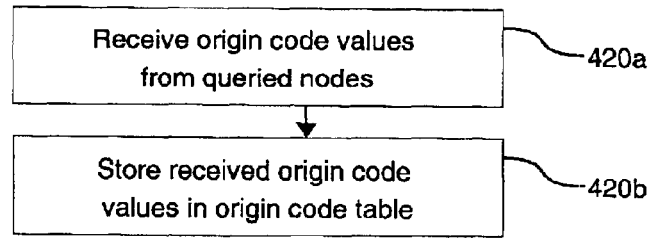

As described above, fabric 600 can include one or more CPU nodes. In FIG. 6, the CPU nodes are located at (1,1) and (3,2). Each of these CPU nodes can be used to perform steps 410 and 420 in FIG. 4 to probe fabric 600 and identify the location of the CPU node relative to the nodes defined as forming the x and y axes. FIG. 5*b* shows steps 410*a*–410*c*, which represent one embodiment for performing the probing step 410 in FIG. 4. FIG. 5*c* shows steps 420*a*–420*b*, which represent one embodiment for performing the identifying step 420. Because there are two CPU nodes in fabric 600, each CPU node performs steps 410 and 420. CPU nodes (1,1) and (3,2) can perform these steps in parallel or serially. If additional CPU nodes were provided in fabric 600, these additional CPU nodes could also perform identical steps 410*a*, 410*b*, 410*c*, 420*a*, and 420*b*.

In steps 410*a*–410*b*, the CPU nodes discover the dimensions of fabric 600. In step 410*a*, CPU node (1,1) determines the number of nodes in fabric 600 in the x-direction by sending out probe messages to increasingly distant nodes in a single direction (the x-direction). Because of the torus nature of interconnection fabric 600, eventually CPU node (1,1) will send a probe message to itself, at which point CPU node (1,1) will recognize that it has traveled the length of the x-dimension of fabric 600. In some embodiments, each CPU node in the system is provided with a unique serial number. All non-CPU nodes can be provided with unique serial numbers as well, or can be provided with a null serial number. When the CPU node sends out the probe message, the probe message requests that the receiving node respond with its serial number. When the responding node transmits back a serial number which the CPU node recognizes as identical to its own, the CPU node can conclude that the length of the x-dimension has been traversed.

In FIG. 6, CPU node (1,1) sends a probe message to a neighboring node in a first direction (e.g., to the right) requesting that node's serial number. This probe message is received by node (2,1), which then transmits a message back to CPU node (1,1) indicating that its serial number is null (or some value different from CPU node (1,1)'s serial number). Next, CPU node (1,1) sends a probe message to the node located two increments out in the same direction. This probe message is received by node (3,1), which also transmits its serial number back to CPU node (1,1). Next, CPU node (1,1)

sends a probe message to the node located three increments out in the same direction. As can be seen in the torus routing shown in FIG. 1, this message would pass through nodes (2,1) and (3,1), and would reach its destination at node (0,1), which would then transmit its serial number back to CPU node (1,1). Finally, CPU node (1,1) would transmit a probe message the node located four increments out in the same direction, which would result in CPU node (1,1) transmitting a probe message to itself. CPU node (1,1) would respond to the probe message with its unique serial number. When CPU node (1,1) receives this response, CPU node (1,1) will conclude that it has traversed the entire length of the x-direction for fabric 600, thereby establishing that M=4 for the M×N fabric 600.

In step 410b, the process described with respect to step 410a is repeated, only in the y-direction. Here, CPU node (1,1) will send probe messages to nodes (1,2), (1,3), (1,0), and ultimately will send a probe message to itself. CPU node (1,1) will then conclude that it has traversed the length of the y-direction for fabric 600, thereby establishing that N=4.

In some embodiments, the process for discovering the dimensions of fabric 600 can tolerate failures in some of the nodes. For example, if node (2,1) was faulty and could not transmit probe messages to node (3,1), CPU node (1,1) could use an alternative communication path to transmit the probe message to node (3,1). For example, CPU node (1,1) could go around node (2,1) and send probe messages through nodes (1,2), (2,2), and (3,2) in order to reach node (3,1) and continue with its discovery process.

In step 410c, CPU node (1,1) sends probe messages to query the origin codes for the various nodes in the fabric. These probe messages are transmitted in much the same way as for steps 410a–410b, except that the probe messages request the node's origin code instead of the node's serial number. Each of the queried nodes will respond with their origin codes, which are received by CPU node (1,1) in step 420a. In step 420b, CPU node (1,1) may store these origin codes in an origin code table.

In accordance with various embodiments, the number of nodes queried and the methodology used to query the nodes for their origin codes may vary. In some embodiments, CPU node (1,1) may send these probe messages to a larger number of nodes, possibly to all of the nodes in fabric 600. By increasing the number of nodes queried for their origin codes, the accuracy of the discovery process may be increased.

In some embodiments, the CPU node may strategically target nodes in order to identify its location relative to the x and y axes while minimizing the number of nodes to be queried. For example, the CPU node may sequentially transmit probe messages to nodes along the same row as the CPU node. If the CPU node receives more than one "0" origin codes, then when a "1" origin code is returned, the CPU node can deduce that the "1" corresponds to the location of the y-axis. Next, the CPU node will transmit probe messages to nodes along the same column. In the same way, if the CPU node receives multiple "0" origin codes, then the first "1" origin code received will correspond to the x-axis. A unique situation occurs when the CPU node is located on one of the axes. Therefore, as the CPU node transmits probe messages along that axis, it will repeatedly receive "1" origin codes from each queried node. In this case, when the CPU node finally receives a "0" origin code response, the CPU node can conclude that it has reached the (0,0) node and can deduce the location of the x and y axes.

In embodiments where all or a significant portion of the nodes are queried for their respective origin codes, it may be unnecessary to assign the (0,0) node with a "0" origin code because a sufficient number of nodes will be probed to accurately locate the two axes. The (0,0) node can be identified as being in both the x and y axes, and can be assigned one origin code of "1". Accordingly, step 400c in FIG. 5a can be omitted.

Figure 7:
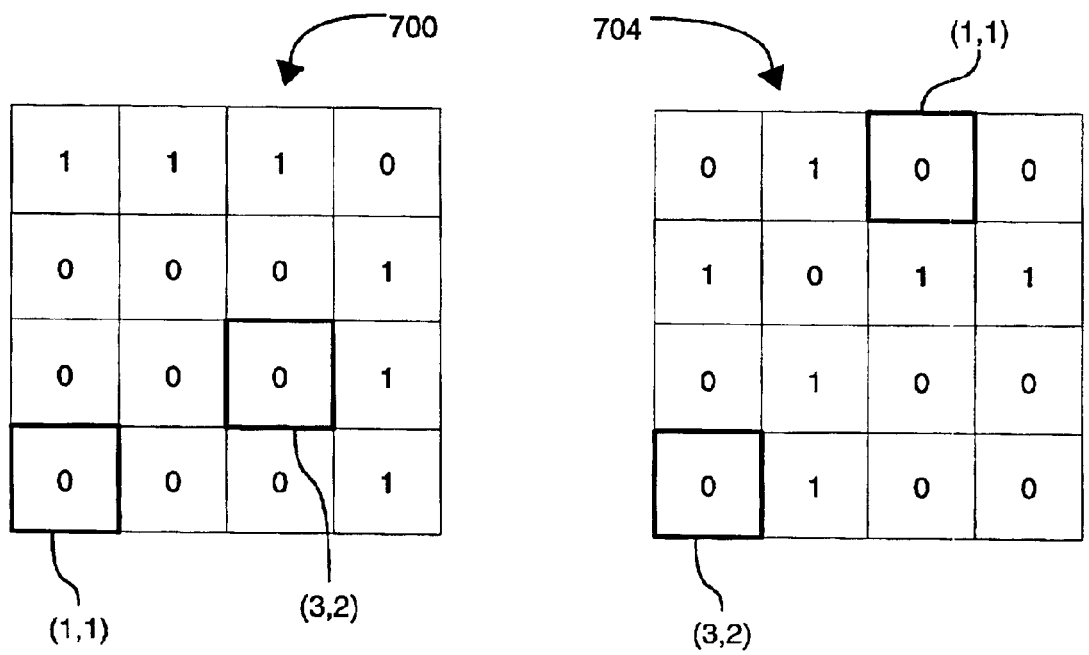
FIG. 7 shows exemplary origin code tables in accordance with embodiments of the present invention.

FIG. 7 illustrates origin code mappings or tables produced by the discovery process of steps 410 and 420. Because of the symmetry of the torus fabric 600, the same origin code data can be represented in different ways, depending on the reference point chosen. Origin code table 700 corresponds to the origin codes retrieved by CPU node (1,1), and origin code table 704 corresponds to the origin codes retrieved by CPU node (3,2). As can be seen in FIG. 7, the origin codes reflect the relative location of the CPU nodes (1,1) and (3,2), from the perspective of CPU nodes (1,1) and (3,2), respectively. By locating the nodes corresponding to the x and y axes, a CPU node located anywhere in the fabric can obtain a constant frame of reference for locating itself and other nodes in the fabric.

Figure 5D:
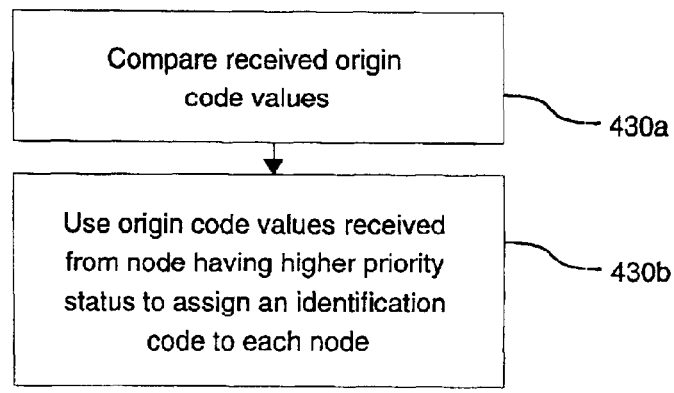

In FIG. 5d, steps 430a–430b represent one embodiment for performing step 430 in FIG. 4. Step 430 addresses the possibility of conflicts in the origin codes retrieved by multiple CPU nodes. In step 430a, the origin codes received by each of the CPU nodes during the discovery process are compared. If this comparison step identifies a disagreement between CPU nodes (1,1) and (3,2) regarding the retrieved origin codes of the nodes in fabric 600, various methodologies can be utilized to resolve this disagreement. In some embodiments, each CPU node is provided with a unique priority level. Therefore, in step 430b, the CPU node having the higher priority level takes precedence and the identification codes generated by that higher priority CPU node are assigned to each node. The priority level for the CPU nodes can be established in a variety of ways, such as, for example, by basing the priority level on the serial number associated with each CPU node so that the CPU node having the highest serial number will be granted the highest priority level.

In some embodiments, each CPU node generates its own origin code mapping and independently proceeds with generating unique identification codes based on that mapping. These identification codes are then transmitted to the other nodes in the fabric. Each identification code includes a reference to the priority level of the transmitting CPU node. Therefore, when there are multiple CPU nodes, each node in the fabric may receive multiple assignments of identification codes. Each node is configured to compare the priority level associated with each new identification code, and will adopt that new identification code only if the associated priority level is higher than the priority level associated with the previously received identification code.

In other embodiments, the multiple CPU nodes may compare their respective priority levels and determine in advance which CPU node has the highest priority level. The CPU node having the highest priority level will be the only CPU node to assign identification codes to the other nodes in the fabric.

After all of the CPU nodes in the fabric agree upon the identification codes used to identify the nodes in the fabric, each CPU node can proceed with independently transmitting instructions and data to the nodes in the fabric. The identification codes can be used, as described above, so that any computation running on system 101 can easily distinguish between the various source and destination nodes of their communications.

In accordance with other aspects of the present invention, each CPU node can perform an error handling process to identify and correct errors in the retrieved origin codes. Two kinds of failures can potentially cause problems during the origin code discovery process: (a) one or more of the nodes may be broken and unable to transport or respond to probe message; and (b) the origin code on one or more of the nodes may be corrupted to produce an incorrect value.

Figure 8:
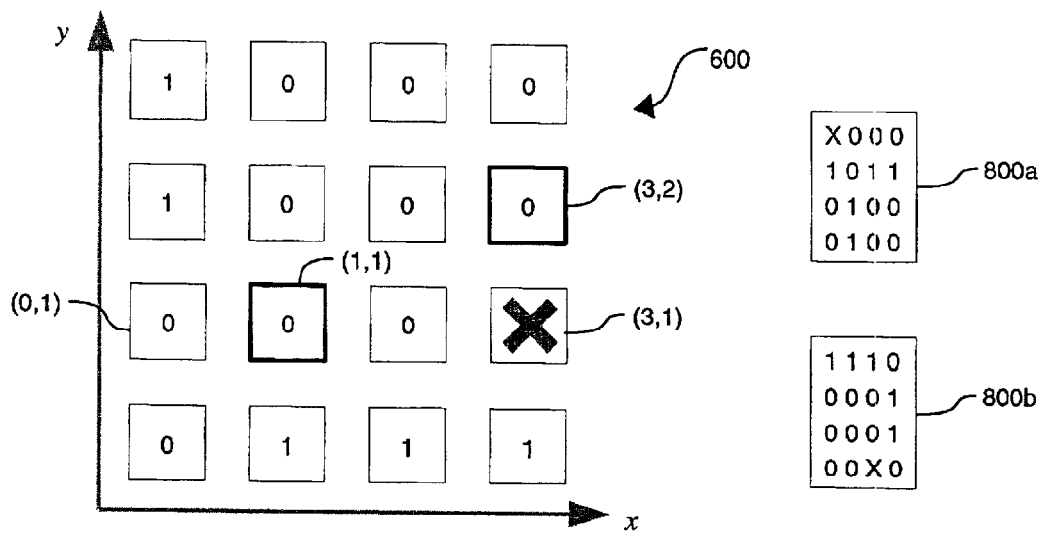
FIG. 8 shows an origin code table having two errors in accordance with embodiments of the present invention.

FIG. 8 shows the retrieved origin codes where two of the nodes, (0,1) and (3,1), have an error. Node (0,1) is part of the y-axis for the fabric 600 and should have its origin code set at "1". However, due to some error, node (0,1) responds to the origin code probe messages with a "0". Node (3,1) has failed and is unable to provide any response to probe message from the CPU nodes. Therefore, the received origin code for that node is a null value. The received origin codes can be represented in observed mappings 800a and 800b, corresponding to CPU nodes (1,1) and (3,2), respectively. These observed mappings represent the locations of CPU nodes (1,1) and (3,2) relative to the origin codes of the other nodes in the fabric 600. In each of the observed mappings 800a and 800b, the "0" in the bottom left-hand corner represents the origin code for the CPU node performing the discovery process. The "X" in the mapping 800 indicates the unresponsive node (3,1).

Figure 9:
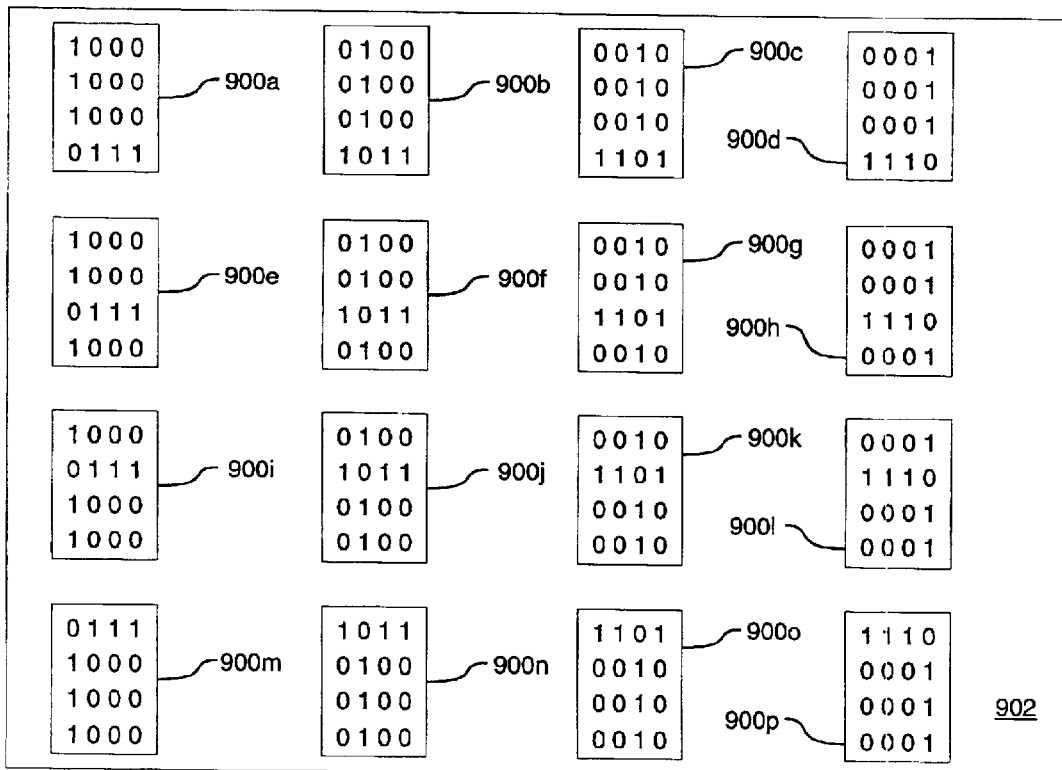
FIG. 9 shows a set of expected origin code mappings in accordance with embodiments of the present invention.

FIG. 9 shows a set 902 of expected mappings 900a–900p of origin codes. These sixteen expected mappings 900 represent the set of legitimate origin codes which can be expected to be received given the sixteen possible locations of the CPU node within a 4×4 fabric. In order to reliably deduce its location relative to the x and y axes, each CPU node can use the observed mapping 800 of origin values for all reachable nodes in fabric 600, and compare that observed mapping 800 with the set 902 of expected mappings 900 that the CPU node can expect to observe. The expected mapping 900 which most closely matches the observed mapping 800 of origin codes represents the most likely configuration of the fabric.

Figure 10:
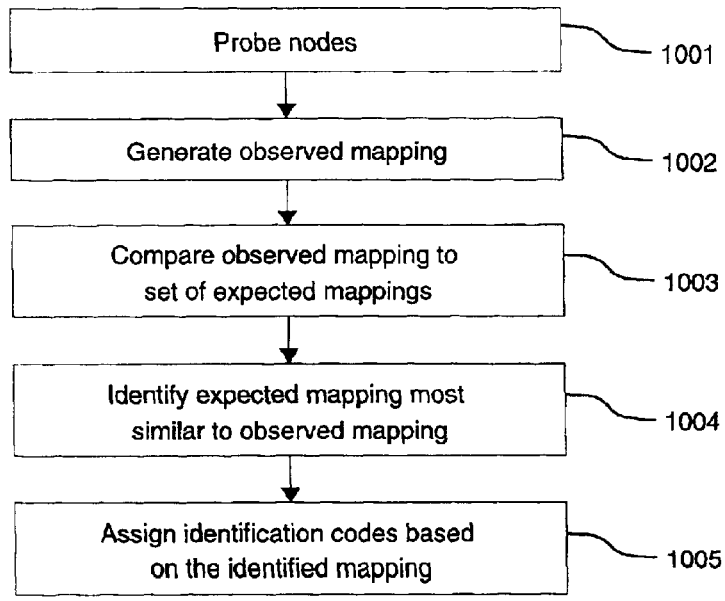
FIG. 10 shows a flowchart of a method of handling errors in the discovery of nodes in an M×N interconnection fabric in accordance with embodiments of the present invention.

FIG. 10 is a flowchart of a method of handling errors in the discovery of nodes in an M×N interconnection fabric in accordance with embodiments of the present invention. In step 1001, the CPU node probes the nodes in the fabric to identify its location relative to the x and y axes of the fabric. This can be accomplished, for example, using the probe messages described above with respect to steps 410, 420. In response to the probe messages, each functioning node returns their respective origin codes. In step 1002, the CPU node generates an observed mapping, such as, for example, observed mapping 800a in FIG. 8. As described above, observed mapping 800a reflects the origin codes which would be received by CPU node (1,1), given the faulty nodes (0,1) and (3,1).

Figure 11:
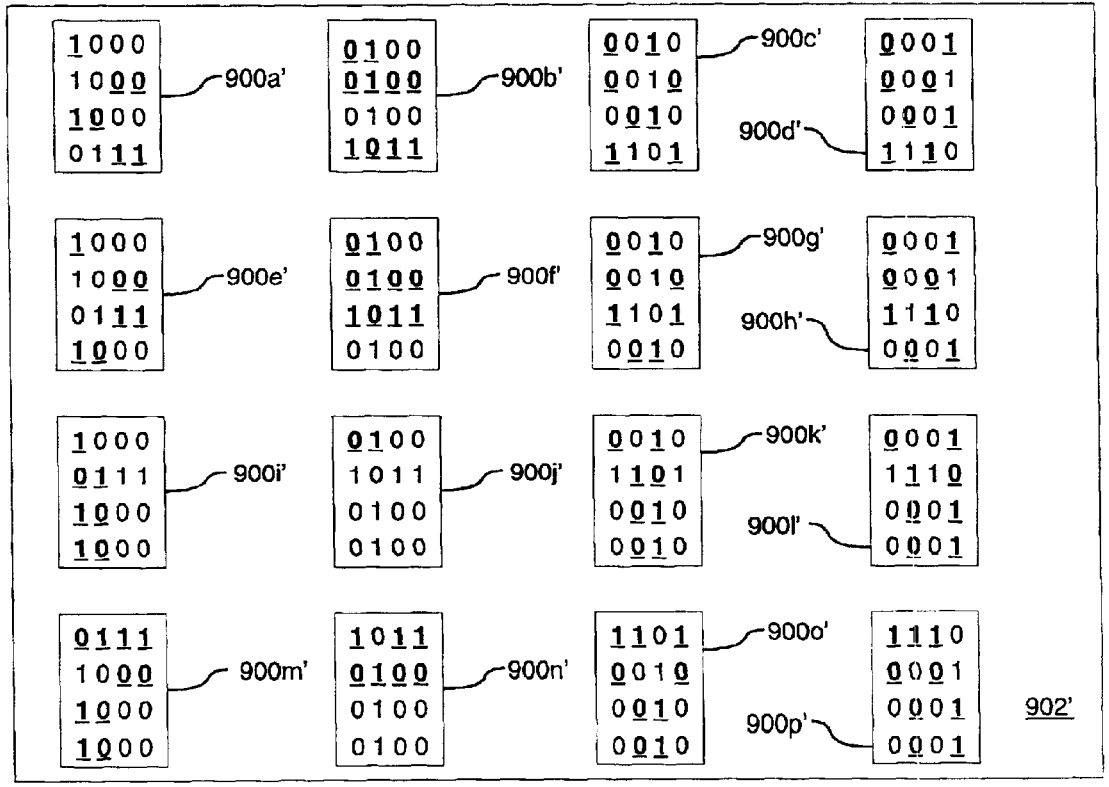
FIG. 11 shows a comparison between an observed mapping and a set of expected origin code mappings in accordance with embodiments of the present invention.

In step 1003, observed mapping 800a is compared to the set 902 of expected mappings 900a–900p. The results of this comparison are shown in set 902' in FIG. 11. For each expected mapping 900a'–900p', the origin codes are compared to the origin codes in observed mapping 800a and the origin codes which differ are underlined. The total number of differences between the observed mapping 800a and the expected mapping 900 is Δ. For example, in FIG. 11, expected mapping 900a' differs from observed mapping 800a in seven places (Δ=7), expected mapping 900b' differs from observed mapping 800a in ten places (Δ=10), and expected mapping 900c' differs from observed mapping 800a in eight places (Δ=8). By comparing each expected mapping 900 to observed mapping 800a, it can be seen that expected mapping 900j' differs from observed mapping 800a in only two places (Δ=2), which the smallest Δ in the set 902 of expected mappings 900. Therefore, in step 1004, expected mapping 910j is identified as being most similar to observed mapping 800a.

Because Δ=2 for expected mapping 900j, the CPU node can then assume that two of the origin codes in observed mapping 800a are in error, and that this identified mapping (expected mapping 900j') represents the actual arrangement of nodes. In step 1005, expected mapping 900j' is adopted by CPU node (1,1) as being the correct mapping and is used to assign identification codes to each of the nodes in the fabric.

For the embodiments in which each node is assigned an origin code according to the described methodology (i.e., "1" for each of the nodes forming an axis and "0" for the (0,0) node and all other nodes), in an M×N array of nodes, there will be M times N number of possible expected mappings, and each expected mapping will differ from the other expected mappings in at least two times the lesser of M and N number of locations (i.e., Δ=2×min(M,N)).

For example, in the described 4×4 array of nodes, there are sixteen possible expected mappings 900. Because M=N=4 in this case, each of these expected mappings 900 differs from the other expected mappings in exactly eight locations. In this situation, any observed mapping which contains three or fewer origin code errors will always be most similar to the expected mapping which represents the actual arrangement of nodes. If the observed mapping contains four origin code errors, then the observed mapping may be most similar to more than one of the expected mappings (i.e., two of the expected mappings will have a Δ=4). Finally, if the observed mapping contains five or more origin code errors, then the observed mapping may appear to be most similar to one of the expected mappings, when the actual arrangement of nodes is represented by another expected mapping.

In other words, in situations where the number of errors in the observed mapping is less than the lesser of M and N (i.e., Δ<min(M, N), then the expected mapping which represents the actual layout of origin codes is the one having Δ<min(M, N). In situations where the number of errors in the observed mapping is greater than min(M, N), this methodology may not result in the selection of the expected mapping which accurately represents the actual layout of nodes.

The set 902 of expected mappings 900 may be stored in a memory accessible to the CPU nodes in the fabric. This memory may also contain other sets of expected mappings, each set corresponding to one of the types of arrays which the CPU node can be expected to encounter. For example, set 902 corresponds to a 4×4 array of nodes, so the memory may also contain sets corresponding to arrays of various dimensions, such as 5×6, 5×7, 5×8, 6×6, 6×7, etc. Once the CPU node has determined the dimensions of the fabric, it can then select the set of expected mappings which corresponds to those dimensions.

In another embodiment, the set 902 of expected mappings 900 is generated dynamically by a CPU node after the CPU node has determined the dimensions of the fabric. Once the CPU node has determined the M+N dimensions, it can generate all possible expected mappings 900 based on preset rules for how the origin codes for the nodes are defined.

The described node mapping process and architecture may be implemented as a method, apparatus, or article of manufacture using standard programming and/or engineering techniques to produce software, firmware, hardware, or any combination thereof. The term "article of manufacture"

as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.)). Code in the computer readable medium is accessed and executed by a processor. The code in which some embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those of ordinary skill in the art will recognize that many modifications may be made to this configuration without departing from the scope of the present invention, and that the article of manufacture may comprise any information bearing medium known in the art.

While the invention has been described in terms of particular embodiments and illustrative figures, those of ordinary skill in the art will recognize that the invention is not limited to the embodiments or figures described. For example, the method by which the nodes are defined as forming the x and y axes can vary and need not be performed exactly as described above. In some embodiments, each node can have its origin code hard-wired into the main board forming system 101, instead of being set by a pin on the node's PCB. Also, different origin coding systems can be utilized. For example, in the above-described embodiment, the origin code is stored in a single-bit select pin and both the x and y axes have their select pins set to the same value (e.g., "1"). This arrangement can minimize the number of pins that are needed for the discovery process. However, in other embodiments, the origin code can be stored in a two or more bit register, thereby providing a higher degree of precision in identifying the node. For example, where the origin code is stored as a two-bit value (using, for example, two select pins), the x-axis nodes can be set at "01", the y-axis nodes set at "10", the (0,0) node set at "00", and all other nodes set at "11".

In addition, in the description above, the probing of fabric 600 is performed by CPU nodes located within fabric 600. In other embodiments, this probing may be performed by a device or module residing elsewhere, such as on host 110. In other embodiments, system 101 can include a separate processing module not residing on the M×N interconnection fabric, but in electrical communication with the nodes in the fabric, such that the separate processing module can probe the entire fabric to identify the location of one of the nodes relative to the x and y axes.

The description above corresponds to a method in which in step 410a–410b, probe messages querying the nodes for their serial numbers are first transmitted to determine the x and y dimensions of fabric 600. Next, in step 410c, probe messages are transmitted to query the nodes for their origin codes in order to locate the x and y axes. In other embodiments, the probing for the serial numbers and the origin codes can be performed simultaneously with the same query. In yet other embodiments, the x and y dimensions can be preset or predefined such that the dimension discovery process is not necessary. Therefore, the CPU nodes can omit steps 410a–410b and proceed with step 410c.

In addition, although the embodiments described above discuss implementations using a 2D torus interconnection fabric, other variations are possible. For example, multiple layers of 2D fabrics can be connected such that each node can be provided with six interconnects (four as shown in FIG. 3, one connecting to a node directly above and one connecting to a node below). It is understood that while the discussion herein refers to x and y dimensions, various embodiments of the invention can be applied to the z-dimension as well.

Therefore, it should be understood that the invention can be practiced with modification and alteration within the spirit and scope of the appended claims. The description is thus to be regarded as illustrative instead of limiting on the invention.

What is claimed is:

1. A method of mapping nodes in an M×N interconnection fabric, wherein M and N are integer values, comprising:
    generating an observed mapping of the nodes in the interconnection fabric showing a location of a first node relative to an x-axis of the fabric and relative to a y-axis of the fabric;
    comparing the observed mapping of the nodes to a set of expected mappings; and
    identifying the expected mapping which is most similar to the observed mapping.

2. The method of claim 1, further comprising:
    assigning identification codes to each of the nodes based on the identified mapping which is most similar to the observed mapping.

3. The method of claim 1, wherein:
    said generating the observed mapping of the nodes comprises generating an observed origin code mapping based on origin codes received from the nodes.

4. The method of claim 3, wherein:
    the set of expected mappings contains a set of all possible valid mappings of origin codes for the M×N fabric; and
    said comparing the observed mapping of the nodes to the set of expected mappings comprises comparing the received origin codes in the observed mapping to the origin codes in each expected mapping in the set of expected mappings.

5. The method of claim 4, wherein:
    said comparing the received origin codes in the observed mapping to the origin codes in each expected mapping in the set of expected mappings comprises:
        for each expected mapping, identifying the number of origin codes which differ between the observed mapping and the expected mapping, wherein $\Delta$ is the number of differing origin codes; and
    said identifying the expected mapping which is most similar to the observed mapping comprises identifying the expected mapping having $\Delta$ than the lesser of M and N.

6. The method of claim 4, wherein:
    each of the nodes forming the x and y axes of the interconnection fabric have an origin code set at a first value; and
    each of the nodes not forming the x and y axes of the interconnection have an origin code set at a second value.

7. The method of claim 3, further comprising:
    sending probe messages to query a first plurality of nodes in the fabric for each of their associated origin codes; and
    receiving the origin code from each of the first plurality of the nodes in the fabric.

8. The method of claim 7, wherein:

said sending probe messages to query the first plurality of nodes in the fabric and said receiving the origin code from each of a first plurality of the nodes in the fabric is performed by the first node.

9. The method of claim 1, further comprising:

identifying the dimensions of the M×N interconnection fabric; and generating the set of expected mappings based on the identified dimensions.

10. A computer system, comprising:

an M×N array of nodes, wherein M and N are integer values;

a plurality of interconnects connecting the M×N array; and a first node in the M×N array configured to:
generate an observed mapping of the nodes showing a location of the first node relative to an x-axis of the fabric and relative to a y-axis of the fabric;
compare the observed mapping of the nodes to a set of expected mappings; and
identify the expected mapping which is most similar to the observed mapping.

11. The system of claim 10, wherein:

the first node is further configured to assign identification codes to each of the nodes based on the identified mapping which is most similar to the observed mapping.

12. The system of claim 10, wherein:

the first node is further configured to generate an observed origin code mapping of the received origin codes.

13. The system of claim 12, wherein:

said set of expected mappings contains a set of all possible valid mappings of origin codes for the M×N fabric; and said first node is further configured to compare the observed mapping of the nodes to the set of expected mappings comprises by comparing the received origin codes in the observed mapping to the origin codes in each expected mapping in the set of expected mappings.

14. The system of claim 13, wherein:

said first node is further configured to compare the received origin codes in the observed mapping to the origin codes in each expected mapping in the set of expected mappings by:
for each expected mapping, identifying the number of origin codes which differ between the observed mapping and the expected mapping, wherein Δ is the number of differing origin codes; and said expected mapping which is most similar to the observed mapping is the expected mapping having Δ less than the lesser of M and N.

15. The system of claim 13, wherein:

each of the nodes forming the x and y axes of the interconnection fabric have an origin code set at a first value; and each of the nodes not forming the x and y axes of the interconnection have an origin code set at a second value.

16. The system of claim 12, wherein said first node is further configured to:

send probe messages to query a first plurality of nodes in the fabric for each of their associated origin codes; and receive the origin code from each of the first plurality of the nodes in the fabric.

17. The system of claim 10, wherein said first node is further configured to:

identify the dimensions of the M×N interconnection fabric; and generate the set of expected mappings based on the identified dimensions.

18. An article of manufacture including code for mapping nodes, wherein the code causes operations to be performed comprising:

generating an observed mapping of nodes in an M×N interconnection fabric showing a location of a first node relative to an x-axis of the fabric and relative to a y-axis of the fabric, wherein M and N are integer values;

comparing the observed mapping of the nodes to a set of expected mappings; and identifying the expected mapping which is most similar to the observed mapping.

19. The article of manufacture of claim 18, further comprising:

assigning identification codes to each of the nodes based on the identified mapping which is most similar to the observed mapping.

20. The article of manufacture of claim 18, wherein:

said generating the observed mapping of the nodes comprises generating an observed origin code mapping of the received origin codes.

21. The article of manufacture of claim 20, wherein:

the set of expected mappings contains a set of all possible valid mappings of origin codes for the M×N fabric; and said comparing the observed mapping of the nodes to the set of expected mappings comprises comparing the received origin codes in the observed mapping to the origin codes in each expected mapping in the set of expected mappings.

22. The article of manufacture of claim 21, wherein:

said comparing the received origin codes in the observed mapping to the origin codes in each expected mapping in the set of expected mappings comprises:
for each expected mapping, identifying the number of origin codes which differ between the observed mapping and the expected mapping, wherein Δ is the number of differing origin codes; and said identifying the expected mapping which is most similar to the observed mapping comprises identifying the expected mapping having Δ less than the lesser of M and N.

23. The article of manufacture of claim 21, wherein:

each of the nodes forming the x and y axes of the interconnection fabric have an origin code set at a first value; and each of the nodes not forming the x and y axes of the interconnection have an origin code set at a second value.

24. The article of manufacture of claim 21, further comprising:

sending probe messages to query a first plurality of nodes in the fabric for each of their associated origin codes; and receiving the origin code from each of the first plurality of the nodes in the fabric.

25. The article of manufacture of claim 24, wherein:

said sending probe messages to query the first plurality of nodes in the fabric and said receiving the origin code from each of the first plurality of the nodes in the fabric is performed by the first node.

* * * * *